United States Patent [19]

Kurosaki et al.

[11] 4,317,383
[45] Mar. 2, 1982

[54] PROPORTIONAL LINEAR OUTPUT SYSTEM

[75] Inventors: Toshiei Kurosaki; Akihiro Takanashi, both of Kokubunji, Japan

[73] Assignee: Hitachi, Ltd., Tokyo, Japan

[21] Appl. No.: 125,095

[22] Filed: Feb. 27, 1980

[30] Foreign Application Priority Data

Mar. 5, 1979 [JP] Japan .................... 54-24502

[51] Int. Cl.³ .................... F16H 21/44; F16H 21/54
[52] U.S. Cl. .................... 74/110; 33/23 R; 74/519
[58] Field of Search .................... 74/110, 519, 520, 521, 74/522; 33/18 R, 23 R, 32 R, DIG. 9, DIG. 12; 358/287; 409/85, 86

[56] References Cited

U.S. PATENT DOCUMENTS 2,986,598  5/1961  Hell ........................................ 74/110
3,264,889  8/1966  Machida et al. ....................... 74/110

FOREIGN PATENT DOCUMENTS 52-47704  4/1977  Japan ..................................... 74/110
  3684  of 1905  United Kingdom ................. 74/104

Primary Examiner—Lawrence J. Staab
Attorney, Agent, or Firm—Craig and Antonelli

[57] ABSTRACT

A proportional linear output system in which a second link mechanism consisting of a link and a slider is coupled to a portion of a link of a first link mechanism consisting of a link and a slider, so that the individual link mechanisms describe geometrically similar figures, and in which an input displacement fed to one slider is converted into an output displacement and is produced by another slider, the quantity of output displacement being reduced according to a ratio of similar figures of the first link mechanism to the second link mechanism.

11 Claims, 6 Drawing Figures

PROPORTIONAL LINEAR OUTPUT SYSTEM

BACKGROUND OF THE INVENTION

The present invention relates to an improved proportional linear output system for transferring displacement on a reduced or an enlarged scale, which works as a mechanism to transfer displacement of a positioning apparatus.

FIG. 1 illustrates a conventional proportional linear output system (refer to Japanese Patent Laid-Open No. 52-9462). According to this system, when an input displacement is applied to a point P, a lever $L_1$ made of a rigid member (which does not develop elastic deformation) rotates with a fulcrum O as a center to produce displacement of a first step on a contracted scale. Further, the displacement at a point Q is contracted by a lever $L_2$ which rotates with a fulcrum S as a center, so that a reduced output displacement is produced at a point R. However, since the input and output displacements undergo rectilinear motion owing to a rectilinearly moving table, positions for transferring displacements at points P, Q and R undergo the changes with the turn of the levers. Consequently, linearity in the output displacement is lost with the turn of the levers, making it difficult to highly precisely maintain a relation of input and output over a wide range of movement.

There has also been proposed a proportional linear output system as shown in FIG. 2 (refer to Japanese Patent Publication No. 38-19032). According to this system, a lever $L_3$ consists of a resilient member and, when an input displacement is given to a point G, a displacement is obtained which is reduced by the principle of a lever and by the elastic deformation. This system, however, presents poor linearity and is not suited for attaining the positioning with high accuracy, although it can be used for small displacements.

Thus, with the conventional proportional linear output systems which are simply based upon the principle of levers, the displacement is reduced depending upon a lever ratio. According to the conventional systems, therefore, the reduction lever undergoes arcuate motion and a point of application of force between an input/output point and the lever undergoes the change with the turn of the lever, causing the linear characteristics to be diminished. Consequently, accuracy is diminished when the positioning is carried out over a wide range.

SUMMARY OF THE INVENTION

In view of the above-mentioned circumstances, the object of the present invention is to provide a proportional linear output system which exhibits excellent linearity and which helps achieve positioning with high accuracy over a wide range of movement.

In order to achieve the above-mentioned object, the proportional linear output system of the present invention is characterized in that a crank of a first link mechanism serves as a slider, a portion of a follower serves as a crank for a second link mechanism, and a follower of the second link mechanism serves as a slider, so that a triangle described by the first link mechanism is geometrically similar to a triangle described by the second link mechanism. According to the system of the invention, the slider of the first link mechanism receives an input displacement, the slider of the second link mechanism produces an output displacement, and a reducing ratio or an enlarging ratio is determined by a ratio of similar figures of the two link mechanisms. The present invention is further characterized in that such link mechanisms are provided in two or three or more stages based upon the same idea.

DETAILED DESCRIPTION OF THE PREFERRED EMBODIMENTS

The invention is mentioned below in detail with reference to embodiments.

Figure 1:
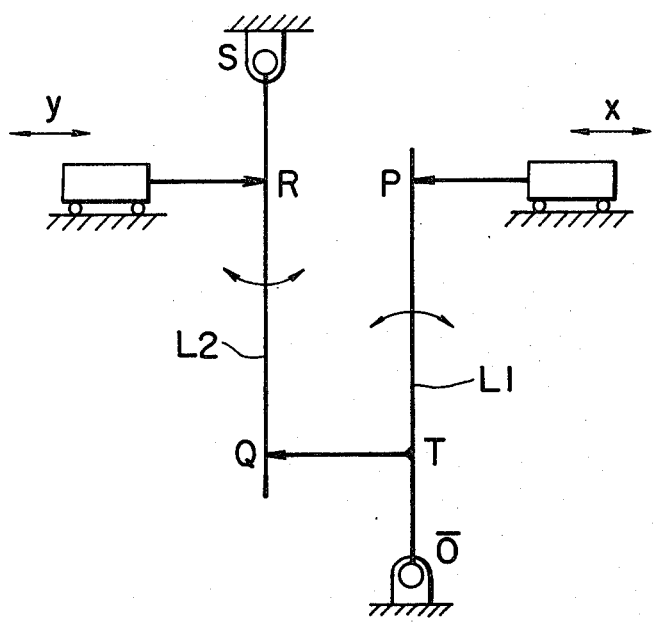
FIGS. 1 and 2 are diagrams illustrating conventional proportional linear output systems.
Figure 2:
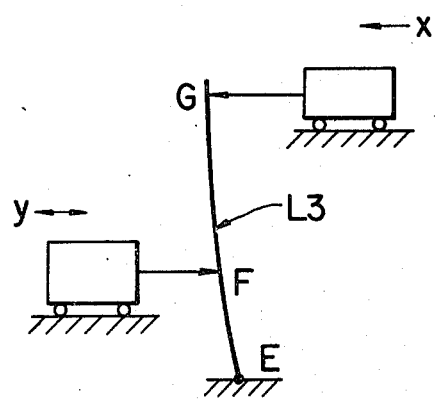
Figure 3:
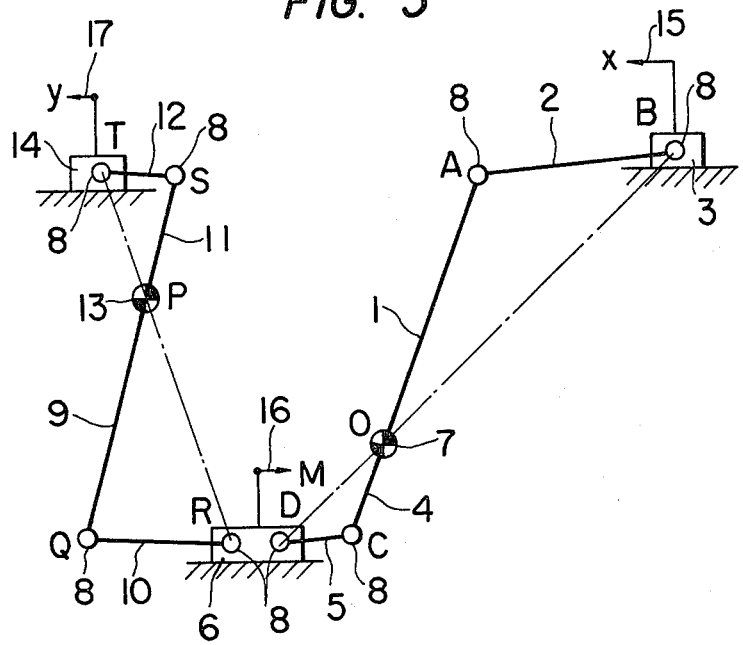
FIGS. 3 and 4 are diagrams illustrating embodiments according to the present invention.

FIG. 3 is a diagram illustrating a proportional linear output system according to an embodiment of the present invention, consisting of two stages of link mechanisms, one describing triangles OAB and OCD of similar figures, and another describing triangles PQR and PST of similar figures. With this system, when an input displacement 15 is given to a slider 3 which is a crank of a first link mechanism, a link 1 rotates via a link 2 with a fulcrum 7 as a center. A link 4 of a second link mechanism is formed as a part of the link 1 which serves as a coupler in the first link mechanism. Accordingly, the link rotates with the fulcrum 7 as a center, whereby a slider 6 is moved via a link 5 to produce an output displacement 16 of a first stage. In this case, the reducing ratio of the output displacement 16 is determined by a ratio of similar figures of the triangle OAB to the triangle OCD. Thus, the input displacement 15 is reduced.

The output displacement 16 of the first stage serves as an input displacement to the mechanism of a second stage. Like the first stage, the reducing ratio is determined by a ratio of similar figures of a triangle PQR to a triangle PST, and an output displacement 17 through the proportional linear output system is produced by a slider 14. In FIG. 3, reference numeral 8 represents pairs of links which constitute link mechanisms, 9 and 10 represent links which constitute the link mechanism which describes the triangle PQR, 11 and 12 represent links which constitute the link mechanism which describes the triangle PST, and reference numeral 13 represents a fulcrum for the links 9 and 11.

The proportional linear output system of the present invention exhibits linearity over a whole range of movement, produces output displacement with extremely high accuracy, and produces extremely small amounts of movement of the order of 0.01 $\mu$m.

Figure 4:
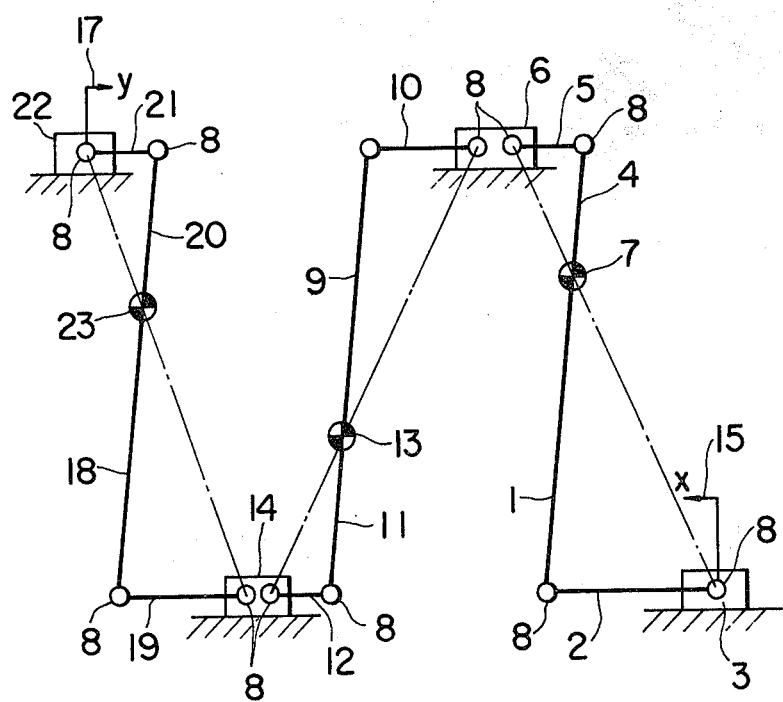

Moreover, to attain further smaller amounts of movement and positioning with more higher accuracy, the link mechanisms should be constructed in three stages as shown in FIG. 4. The positioning with further higher accuracy can be realized by increasing the number of stages of the link mechanisms. In FIG. 4, the input displacement 15 is transferred through three stages of link mechanisms, and is converted into an output displacement 17 of a reduced quantity. Reference numerals 18, 19, 20 and 21 denote links of a third link mechanism, 22 denotes a slider of the third link mechanism, and 23 denotes a fulcrum of the links 18, 20. Other reference numerals denote the same members as those of FIG. 3.

Figure 5:
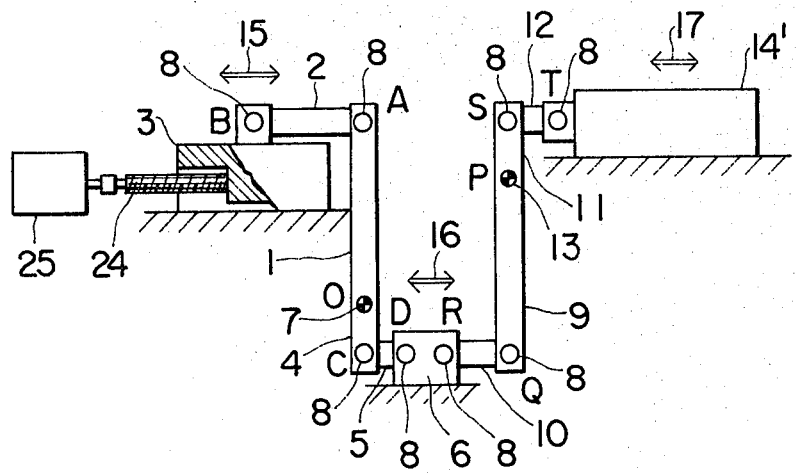
FIG. 5 is a diagram when the present invention is applied to a precision moving table.

FIG. 5 illustrates the case when the proportional linear output system of the present invention which works as a system for transmitting the displacement, is applied to a precision moving plate. Owing to excellent linearity of the proportional linear output system of the present invention, the precision moving plate enables the positioning to be attained in a so-called open-loop control system responsive to the input displacement only, without the need of feedback control which has generally been effected by measuring the positions. The input displacement can be given by a pulse motor and a feed screw. In FIG. 5, reference numeral 14 denotes a table that will be finely moved to attain the positioning. A link mechanism consisting of links 1, 2, 4, 5, 9, 10, 11, 12 and sliders 3, 6, works as a proportional linear output system. Reference numeral 24 denotes a feed screw, and 25 denotes a pulse motor.

Operation of the apparatus is mentioned below. When a predetermined number of pulses are fed to the pulse motor 25, the feed screw 24 is rotated, and the input displacement 15 is given to the slider 3 of the proportional linear output system. The input displacement is given to the proportional linear output system, transferred while being reduced for its moving quantity, and is converted into an output displacement which is produced by a table 14' as denoted by 17.

According to the precision moving plate of the present invention constructed as mentioned above, the movement of very small amounts of the order of 0.01 $\mu$m can be realized or, in other words, the positioning with extremely high accuracy of the order of smaller than 1 $\mu$m can be effected by simply feeding predetermined pulses to the pulse motor. Further, since the apparatus is based upon the open-loop control system employing pulse motor, the positioning operation can be carried out at higher speeds.

Figure 6:
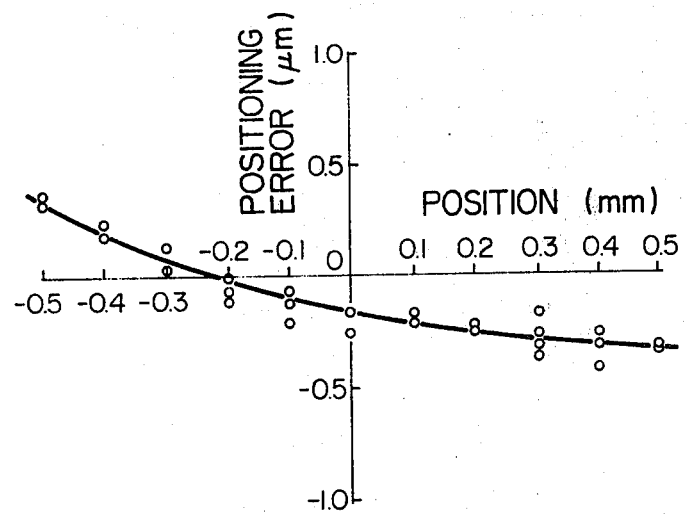
FIG. 6 is a diagram showing characteristics attained by the present invention.

FIG. 6 is a diagram of a characteristic curve which represents the positioning accuracy according to the system of the present invention. The positioning accuracy is measured using a laser-interference length measuring instrument, and the positions are measured by positioning the apparatus at points at intervals of each 100 $\mu$m by feeding pulses of a number corresponding to the output displacement to the pulse motor. It will be understood from FIG. 6 that the positioning error does not exceed ±0.4 $\mu$m over a moving range of as wide as about ±0.5 mm, making it possible to attain the positioning with high accuracy that was not materialized with the conventional technique. In this case, the reducing ratio is $1\sqrt{50}$ through each stage or 1/50 through the whole stages (two stages). Furthermore, according to the system of the present invention, a minimum step is 0.05 $\mu$m per pulse (which is a resolving power of the system when one pulse is fed to the pulse motor).

The present invention should not necessarily be restricted to the link mechanisms which are concretely illustrated in the above-mentioned embodiments but can be applied to any mechanisms provided they are essentially so constructed that another link mechanism consisting of a link and a slider is coupled to a portion of a link of a link mechanism consisting of a link and a slider, so that the individual link mechanisms describe figures of a geometrically similar shape, and so that an input displacement fed to one slider is converted into an output displacement of a quantity reduced according to a ratio of similar figures of the link mechanisms, and is produced by another slider. Moreover, although the aforementioned embodiment of the present invention has dealt with a multi-stage mechanism, the invention can of course be applied to a mechanism of a single stage as a fundamental form. Furthermore, the present invention should not be restricted to the embodiments of the aforementioned concrete numerical values or moving ranges that are used for the purpose of illustration, but can be applied to those having any suitable values which are selected as required.

As mentioned in detail in the foregoing, the proportional linear output system of the present invention exhibits linearity with high accuracy over a wide range of movement, and helps obtain very small amounts of movement. Therefore, the system of the present invention finds extensive applications not only in the fields of step-and-repeat cameras and reduction projection aligner system but also in the fields of precision measuring instruments and precision systems.

The abovementioned embodiments have dealt with the cases in which the input displacement was converted into the output displacement of a reduced quantity. When the system of the present invention is used in a reversed manner, however, a very small input displacement can be converted into a large output displacement, and a very small input can be converted into a large output.

What is claimed is:

1. A proportional linear output system including a first lever pivotal about a first point, a second lever linked to the first lever at a second point and having an end point linked to an input element, and a third lever linked to the first lever at a third point and having an end point linked to an output element, wherein the first point and the second point of said first lever and the end point of said second lever, on the one hand, and the first point and the third point of said first lever and the end point of said third lever, on the other hand, define similar geometric figures, and wherein said input element and said output element are movable in planes parallel to each other.

2. A proportional linear output system according to claim 1, wherein said levers are sized and said lever and link points arranged for yielding an output displacement that is reduced in accordance with the ratio of the similar figures in response to an input displacement of the input element.

3. A proportional linear output system according to claim 1 or 2, wherein said input and output elements, comprise sliders.

4. A proportional linear output system according to claim 1, wherein said levers are sized and said pivot and link points arranged for yielding an output displacement that is magnified in accordance with the ratio of the similar figures in response to an input displacement of the input element.

5. A proportional linear output system according to claim 1, wherein said pivot point is stationary relative to said first lever during operation of said system in response to displacement of said input element.

6. A proportional linear output system according to claim 3, wherein said input element, first, second and third levers and output element comprise a first stage, and wherein said output element comprises an input element of a second stage including a fourth lever pivotal about a fourth point, a fifth lever linked to said fourth lever at a fifth point and having an end point linked to said second stage input element, and a sixth lever linked to the third lever at a sixth point and having an end point linked to an output element of the second stage.

7. A proportional linear output system according to claim 6, wherein said pivot points are stationary relative to said first and fourth levers, respectively, during operation of said system in response to displacement of said first stage input element.

8. A proportional linear output system according to claim 6, wherein said levers and an imaginary line through said end and pivot points form similar triangular figures.

9. A proportional lever output system according to claim 6, wherein said second stage output comprises an input element of a third stage including seventh, eighth, and ninth levers and a third stage output element in a like, but mirror-image manner relative to said first stage.

10. A proportional linear output system according to claim 1 or 2 or 5, wherein said levers and an imaginary line through said end and pivot points form similar triangular figures.

11. A proportional linear output system according to claim 10, wherein said input and output elements, comprise sliders.

* * * * *